Patented Aug. 27, 1935

2,012,612

UNITED STATES PATENT OFFICE 2,012,612

METHOD OF PREPARING EMULSIONS

Samuel Lenher and Charles Titus Mentzer, Jr., Wilmington, Del., assignors to E. I. du Pont de Nemours & Company, Wilmington, Del., a corporation of Delaware No Drawing. Application July 1, 1933, Serial No. 678,715

14 Claims. (Cl. 252—6)

This invention relates to a novel method for preparing emulsions, more particularly it relates to the preparation of emulsions comprising an aqueous phase and, involving the use of sulphate ester salts of normal straight-chain primary aliphatic alcohols, having at least eight carbon atoms. Still more particularly it relates to the preparation of emulsions in which the two phases are water and oil.

According to present practices emulsions of the latter type are prepared by the use of oleates and stearates as emulsifying agents.

It is an object of the present invention to provide a satisfactory method for preparing emulsions comprising water as one phase by the use of salts of alkyl sulphate esters, containing eight or more carbon atoms and characterized in that the alkyl radical is a normal straight-chain primary radical. It is a further object to prepare water-in-oil emulsions by the use of water-insoluble salts of the aforementioned alkyl sulphate esters and to prepare oil-in-water emulsions by the use of water-soluble salts of the alkyl sulphate esters. An important object of the invention comprises the preparation of aqueous emulsions by the use of the aforesaid sulphate ester salts by dissolving the alkyl sulfuric acid in one phase and a base in the other phase, then mixing and homogenizing the two phases while forming the sulfate ester salt in situ. Other objects of the invention will appear hereinafter.

The following examples illustrate methods for applying the principles of the invention. These examples are intended to be construed as illustrative and not as limiting the scope of the invention.

Example 1

50 parts by weight of a heavy paraffin base water-white oil having an A. P. I. specific gravity of 31 ("White Rose" oil) is mixed with 1 part of n-lauryl-1-sulfuric acid which dissolves in the oil. 0.25 part of lead acetate is dissolved in 48.75 parts of distilled water. The aqueous lead acetate solution is poured into the sulfate ester-oil solution with rapid stirring at room temperature. The lead salt forms rather slowly and a cream-colored emulsion results. This emulsion can be extended, without breaking, with a large quantity of oil. The emulsion is a heavy grease and has good lubricating properties.

Example 2

30 grams of a heavy paraffin base water-white oil, having an A. P. I. specific gravity of 31 ("White Rose" oil), 30 grams of neat's foot oil and 2 grams of the sulfuric acid ester of lauryl alcohol, which dissolves in the oil, are mixed together. 2 cc. of a 25% caustic soda solution are added to 36 cc. of distilled water. The ester-oil mixture is added to the caustic soda solution with high speed stirring at room temperature. The oils are readily emulsified and the emulsion is readily extended in water.

The finished emulsion has a pH of 8 and is very satisfactory for soaking natural silk to soften the serecin.

Example 3

30 grams of "White Rose" oil and 1 gram of the sulfuric acid ester of lauryl alcohol are mixed. 1 cc. of a 25% solution of caustic soda is added to 18 cc. of distilled water. The ester-oil mixture is then added with high speed stirring to the caustic soda solution. This emulsion is quite stable and is readily extended with water.

These emulsions prepared as above are close to neutral and by careful adjustment they may be prepared neutral.

Example 4

0.5 of a part by weight of a 25% caustic soda solution are added to 29 parts by weight of water. This solution is then heated to boiling. 0.5 part by weight of the sulfuric acid ester of lauryl alcohol is mixed well with 70 parts by weight of asphalt at 120° C. and this is added immediately to the boiling caustic soda solution. The emulsion forms readily.

The temperature at which the emulsions may be formed is not critical but the water-oil emulsions are more readily and more economically prepared at low temperatures, such as room temperature. This invention, however, is not to be limited to any temperature range, since it will be apparent that widely varying temperatures may be employed to advantage in preparing emulsions of water with other materials than oil. Rapid stirring is advisable in order that the emulsion may be rapidly formed. It is preferred that the salt of the alkyl sulphate ester be prepared in situ, according to the method described in the several examples.

A wide variety of materials are intended to be included within the scope of this invention. It comprises the preparation of emulsions of two general types, (1) the preparation of dispersions of water in a liquid immiscible with water and (2) dispersions of such an immiscible liquid in water. Various types of oils may be treated in accordance with the invention to give stable water-in-oil or oil-in-water emulsions. By way of example, oils that may be treated in this fashion are Nujol, neat's foot oil, olive oil, castor oil, cottonseed oil, ordinary petroleum lubricating oils and the like.

Sulfuric acid esters used in accordance with the present invention may be prepared by treating a normal straight-chain primary aliphatic alcohol having at least 8 carbon atoms and preferably between 12 to 18 carbon atoms (obtainable by the catalytic hydrogenation of the higher fatty acids which may be obtained from fats or oils, naturally occurring glycerides or alkyl esters of the fatty acids) with strong normal sulfonating agents, such as 100% sulfuric acid, fuming sulfuric acid, or chlorsulfonic acid at a temperature of 0 to 30° C. The resulting compound is a true n-alkyl-1-sulfuric acid.

The sulfate ester salts used in accordance with the present invention contain at least 8 and preferably from 12 to 18 carbon atoms. Thus, the sulfate esters include, by way of example, the sulfuric acid esters of lauryl, myristyl, cetyl, stearyl, oleyl and ricinoleyl alcohols. Either the single alkyl sulfate ester salts or mixtures of various sulfate ester salts may be used. Emulsifying agents known to the art may be used in conjunction with the alkyl sulfate ester salts, if desired, to assist the emulsifying action of the sulfate ester salts. Likewise, known agents which will stabilize or emulsify the emulsions or which will inhibit oxidation of the oil phase may be used in conjunction with the sulfate ester salts.

In accordance with the present invention these acid esters are preferably neutralized in situ with the water soluble compound of the metal. In preparing oil-in-water emulsions a compound of a metal which forms a soluble salt with the n-alkyl-1-sulfuric acid will be used. Among the compounds which may be used are soluble oxides or hydroxides, sodium, potassium, ammonium, lithium or magnesium or the salts of these metals with weak acids. In preparing water-in-oil emulsions the n-alkyl-1-sulfuric acid is neutralized with a water soluble compound of a metal which forms a water insoluble salt with the n-alkyl-1-sulfuric acid. Such metals are for example, lead, aluminum, iron, tin and barium.

The proportion of sulfate esters, or ester salts which is used to prepare the emulsions may be varied between wide limits, e. g., from 0.02% up to 10% by weight of the oil or other liquid immiscible with water, although the preferred range is between 0.05% and 2%.

In general this invention includes within its scope the preparation of emulsions in which water constitutes one phase and a liquid immiscible with water constitutes the other phase. The invention is particularly applicable to the preparation of water-in-oil emulsions which may be used as lubricating greases, e. g., an emulsion of water in an oil such as an ordinary lubricating oil or other mineral oil. Emulsions suitable for use as paints (water-linseed oil type), emulsions to be used in silk soaking, etc. may also be made according to the process disclosed herein. The emulsions prepared according to this method are all stable and are easily diluted with oil or water as the case may be within reasonable limits without a decided change in viscosity.

Copending application Serial No. 678,714, filed July 1, 1933, describes and claims water in oil emulsions produced with the aid of insoluble salts of the sulfonated compounds described herein.

The above description and specific examples are given by way of illustration only. Any variation therefrom which conforms to the spirit of the invention is intended to be included within the scope of the claims.

We claim:

1. A process of emulsifying water and a mineral oil which comprises dissolving in water a member of the class consisting of metallic hydroxides, metallic oxides and metallic salts, dissolving in the immiscible liquid an alkyl sulfuric acid, the alkyl radical of which is the radical of a normal straight-chain primary aliphatic alcohol having at least eight carbon atoms, then mixing and homogenizing the water and said mineral oil.

2. The process of claim 1 characterized in that the alkyl radical contains 12 to 18 carbon atoms.

3. The process of claim 1 characterized in that water forms the external phase and the compound dissolved in water will form a water soluble salt with the said alkyl sulfuric acid.

4. The process of claim 1 characterized in that water forms the dispersed phase and the compound dissolved in water will form a water insoluble salt with the said alkyl sulfuric acid.

5. The process of claim 1 characterized in that water forms the external phase and the compound dissolved in water will form a water soluble salt with the said alkyl sulfuric acid and further characterized in that said alkyl sulfuric acid contains from 12 to 18 carbon atoms.

6. The process of emulsifying water and mineral oil which comprises dissolving in water an alkali metal hydroxide, dissolving in oil an alkyl sulfuric acid the alkyl radical of which is the radical of a normal straight-chain primary aliphatic alcohol having at least eight carbon atoms, then mixing and homogenizing the water and mineral oil.

7. The process of claim 5 characterized in that the alkali metal hydroxide is sodium hydroxide.

8. An emulsion which comprises water in one phase, a mineral oil in another phase, and a salt of an alkyl sulfuric acid, the alkyl radical of which is the radical of a normal straight chain primary alcohol having at least eight carbon atoms.

9. The product of claim 8 characterized in that the alkyl radical contains twelve to eighteen carbon atoms.

10. The product of claim 8 characterized in that the water forms the external phase and the salt of the alkyl sulfuric acid is soluble in water.

11. The product of claim 8 characterized in that the water forms the dispersed phase and the salt of the alkyl sulfuric acid is insoluble in water.

12. The product of claim 8 characterized in that the water forms the external phase and the salt of the alkyl sulfuric acid is soluble in water and characterized in that said alkyl sulfuric acid contains from 12 to 18 carbon atoms.

13. The product of claim 8 characterized in that the water forms the external phase, and the salt of the alkyl sulfuric acid is an alkali metal salt.

14. The product of claim 8 characterized in that the water forms the external phase, and the salt of an alkyl sulfuric acid is a sodium salt.

SAMUEL LENHER.
CHARLES TITUS MENTZER, Jr.